(12) United States Patent
Deleplanque et al.

(10) Patent No.: US 11,926,180 B2
(45) Date of Patent: Mar. 12, 2024

(54) MOTOR VEHICLE COMPUTER FOR DETECTING THE THEFT OF A WHEEL

(71) Applicant: Continental Automotive Technologies GmbH, Hannover (DE)

(72) Inventors: Fabien Deleplanque, Toulouse (FR); Vincent Létard, Toulouse (FR); Jean-Charles Huard, Toulouse (FR)

(73) Assignee: Continental Automotive Technologies GmbH (DE)

( * ) Notice: Subject to any disclaimer, the term of this patent is extended or adjusted under 35 U.S.C. 154(b) by 0 days.

(21) Appl. No.: 18/275,462

(22) PCT Filed: Feb. 15, 2022

(86) PCT No.: PCT/EP2022/053686
§ 371 (c)(1),
(2) Date: Aug. 2, 2023

(87) PCT Pub. No.: WO2022/175271
PCT Pub. Date: Aug. 25, 2022

(65) Prior Publication Data
US 2024/0034107 A1    Feb. 1, 2024

(30) Foreign Application Priority Data
Feb. 17, 2021    (FR) ...................... 2101518

(51) Int. Cl.
*B60C 23/04*    (2006.01)
(52) U.S. Cl.
CPC ...... *B60C 23/0438* (2013.01); *B60C 23/0447* (2013.01)
(58) Field of Classification Search
CPC ................. B60C 23/0438; B60C 23/0447
(Continued)

(56) References Cited

U.S. PATENT DOCUMENTS

| 6,611,229 B2* | 8/2003 | Muramatsu | ............. B60R 25/33 |
| | | | 342/357.57 |
| 7,224,263 B2* | 5/2007 | Maehara | ............... B60R 25/104 |
| | | | 340/426.25 |

(Continued)

FOREIGN PATENT DOCUMENTS

| DE | 102006012535 A1 | 10/2006 |
| DE | 102015115376 A1 | 3/2016 |

(Continued)

OTHER PUBLICATIONS

International Search Report and Written Opinion for International Application No. PCT/EP2022/053686, dated May 19, 2022, 7 pages.

(Continued)

*Primary Examiner* — Eric Blount
(74) *Attorney, Agent, or Firm* — Buchanan, Ingersoll & Rooney PC

(57) ABSTRACT

A method for signaling the theft of a wheel of a motor vehicle. The vehicle includes a plurality of wheels and a computer. At least one of the wheels includes a sensor. The method includes, for the at least one wheel, the steps of measuring at least one value for the internal pressure of the tire of the wheel, detecting that the vehicle has been raised if the absolute value of the difference between the at least one measured internal pressure value and a predetermined reference internal pressure value is greater than a predetermined pressure difference threshold when it is detected the vehicle has been raised, detecting the detachment of the wheel when it is detected that the wheel has become detached, and signaling the theft of the wheel.

7 Claims, 2 Drawing Sheets

(58) Field of Classification Search
USPC .................................................. 340/426.13
See application file for complete search history.

(56) References Cited

U.S. PATENT DOCUMENTS

| | | | |
|---|---|---|---|
| 8,400,289 B2 | 3/2013 | Heise et al. | |
| 9,669,801 B2* | 6/2017 | Utter | B60C 23/0408 |
| 10,131,320 B2* | 11/2018 | Schmotzer | G08B 13/1427 |
| 10,131,362 B1* | 11/2018 | Gingrich | G05D 1/021 |
| 11,247,637 B1* | 2/2022 | Angelillo | B60R 25/40 |
| 11,565,655 B2* | 1/2023 | Weston | B60R 25/09 |
| 2008/0048847 A1* | 2/2008 | Shimomura | B60C 23/0408 340/426.33 |
| 2012/0126967 A1* | 5/2012 | McCormick | B60C 23/0408 340/445 |
| 2016/0075306 A1* | 3/2016 | Utter | B60R 25/1001 340/426.31 |
| 2017/0057461 A1* | 3/2017 | Gaskin | G08B 21/0269 |
| 2018/0086306 A1* | 3/2018 | Schmotzer | G08B 13/1427 |
| 2020/0001828 A1* | 1/2020 | Loeffler | B60C 23/06 |
| 2021/0331516 A1* | 10/2021 | Blanco Barrera | B60B 3/165 |

FOREIGN PATENT DOCUMENTS

| | | | | |
|---|---|---|---|---|
| FR | 2957571 A1 * | 9/2011 | | B60C 23/02 |
| WO | WO-2018114577 A1 * | 6/2018 | | B60C 23/0408 |

OTHER PUBLICATIONS

International Search Report and Written Opinion for International Application No. PCT/EP2022/053686, dated May 19, 2022, 11 pages (French).

French Search Report for French Application No. 2101518, dated Sep. 6, 2021 with translation, 9 pages.

English Translation of the Written Opinion for International Application No. PCT/EP2022/053686, dated May 19, 2022, 6 pages.

* cited by examiner

MOTOR VEHICLE COMPUTER FOR DETECTING THE THEFT OF A WHEEL

CROSS REFERENCE TO RELATED APPLICATIONS

This application is the U.S. National Phase Application of PCT International Application No. PCT/EP2022/053686, filed Feb. 15, 2022, which claims priority to French Patent Application No. 2101518, filed Feb. 17, 2021, the contents of such applications being incorporated by reference herein.

FIELD OF THE INVENTION

The invention relates to the field of sensors for a motor vehicle and more specifically to a wheel sensor allowing the theft of the wheels of a motor vehicle to be detected.

BACKGROUND OF THE INVENTION

There are several steps to the theft of a wheel of a motor vehicle. Firstly, the vehicle needs to be raised, for example, by means of a jack. Then, the clamping bolts need to be removed from the wheels and then the wheel itself needs to be removed.

Nowadays, in order to prevent a wheel from being stolen from a vehicle, installing a wheel anti-theft system on the vehicle is known.

In a first solution, the wheel anti-theft system comprises anti-theft nuts mounted on each wheel of the vehicle. An adapted unlocking key is used to mount or remove said anti-theft nuts.

In a second solution, the anti-theft system is a system for detecting that the vehicle has been raised. When raising of the vehicle is detected, the anti-theft system activates an alarm, which can be heard by any person close to the vehicle and the aim of which is to scare away the thief.

However, these two solutions have disadvantages.

Firstly, the key for unlocking the anti-theft bolts is often retained by the owner in the vehicle itself. Thus, the thief simply needs to break into the vehicle in order to retrieve the unlocking key. Furthermore, the thief can also possess a copy of the unlocking key.

The raising system, for its part, is an additional system that can prove to be particularly expensive.

Therefore, a requirement exists for a solution for at least partly overcoming these disadvantages.

SUMMARY OF THE INVENTION

To this end, an aspect of the invention firstly relates to a method for signaling the theft of a wheel of a motor vehicle, said vehicle comprising a plurality of wheels and a computer, with at least one of the wheels comprising a sensor, said method comprising, for the at least one wheel, the steps of:
  measuring at least one value of the internal pressure of the tire of the wheel;
  detecting that the vehicle has been raised when the absolute value of the difference between the at least one measured internal pressure value and a predetermined reference internal pressure value is greater than a predetermined pressure difference threshold;
  when raising of the vehicle is detected, detecting the detachment of the wheel;
  when detachment of the wheel is detected, signaling the theft of the wheel;

said method being characterized in that the step of detecting the detachment of the wheel comprises the steps of:
  in a mode called "raising" mode, the sensor periodically transmitting a raising detection signal to the computer as long as raising of the vehicle is detected;
  the computer receiving said transmitted raising detection signal;
  measuring the strength of the received raising detection signal;
  the computer detecting the detachment of the wheel if at least one measured strength value is less than a predetermined strength threshold.

The method allows the theft of a wheel of a vehicle to be detected and the owner or the user of said vehicle to be notified of the theft of the wheel, where applicable. The method thus implemented does not require the addition of an expensive additional device or the use of an unlocking tool. Indeed, the method is implemented by a computer and at least one sensor, already present in the vehicle.

Thus, the method simply and quickly allows the detachment of the wheel from the vehicle to be detected, since measuring the strength of a signal is simple and fast to implement.

According to another embodiment, the detachment of the wheel is detected if the absolute value of the difference between the measured strength value and a predetermined reference strength value is greater than a predetermined strength variation threshold.

Advantageously, the at least one transmitted raising detection signal is a radiofrequency type signal.

A radiofrequency type signal is simple to use.

According to another embodiment, the detachment of the wheel is detected if the absolute value of the difference between at least one measured strength value and a second predetermined reference strength value is greater than a second predetermined strength variation threshold.

Advantageously, during the step of detecting the detachment of the wheel, the computer is configured to send a notification signal to the user of the vehicle in the event of the theft of the wheel. For example, the notification signal is a text (a message) sent to the smartphone of the user of the vehicle.

The method thus allows the user of the vehicle to be notified, who notably could attempt to prevent the thief from completely stealing a wheel of the vehicle, or who could notify law enforcement agencies in this respect.

According to another embodiment, during the step of detecting the detachment of the wheel, the sensor is configured to signal the theft of the wheel, for example, by sending a notification signal to the user of the vehicle.

An aspect of the invention also relates to a computer program product, characterized in that it comprises a set of program code instructions, which, when they are executed by one or more processors, configure the one or more processors to implement a method as described above.

An aspect of the invention also relates to a sensor for a motor vehicle, said vehicle comprising a plurality of wheels and a computer, said sensor being intended to be mounted in a wheel of said vehicle, said sensor being configured for:
  measuring at least one value of the internal pressure of the tire of the wheel;
  detecting that the vehicle has been raised if the absolute value of the difference between the at least one measured internal pressure value and a predetermined reference internal pressure value is greater than a predetermined pressure difference threshold;
  transmitting a raising detection signal to the computer;

in a raising mode, periodically measuring the acceleration along the axis of rotation of the wheel;

detecting the detachment of the wheel when the absolute value of the variation of the measured acceleration is greater than a predetermined acceleration variation threshold;

signaling the theft of the wheel when detachment of the wheel has been detected.

According to another embodiment, the sensor is configured for:

transmitting at least one raising detection signal to the computer;

periodically receiving a response signal transmitted by the computer;

measuring the strength of each received response signal;

detecting the detachment of the wheel if at least one measured strength value is less than a second predetermined strength threshold;

signaling the theft of the wheel when detachment of the wheel has been detected.

Preferably, the sensor is configured to signal theft by sending a signal for detecting the detachment of the wheel to the computer.

Also preferably, the sensor is configured to signal theft by sending a notification signal to the user of the vehicle.

An aspect of the invention also relates to a motor vehicle, said vehicle comprising a plurality of wheels and a computer, with at least one of the wheels comprising a sensor, the computer and the at least one sensor being configured to implement the method as described above.

BRIEF DESCRIPTION OF THE DRAWINGS

Further features and advantages of the invention will become apparent upon reading the following description. This description is purely illustrative and must be read with reference to the accompanying drawings, in which.

DETAILED DESCRIPTION OF AT LEAST ONE EMBODIMENT

Figure 1:
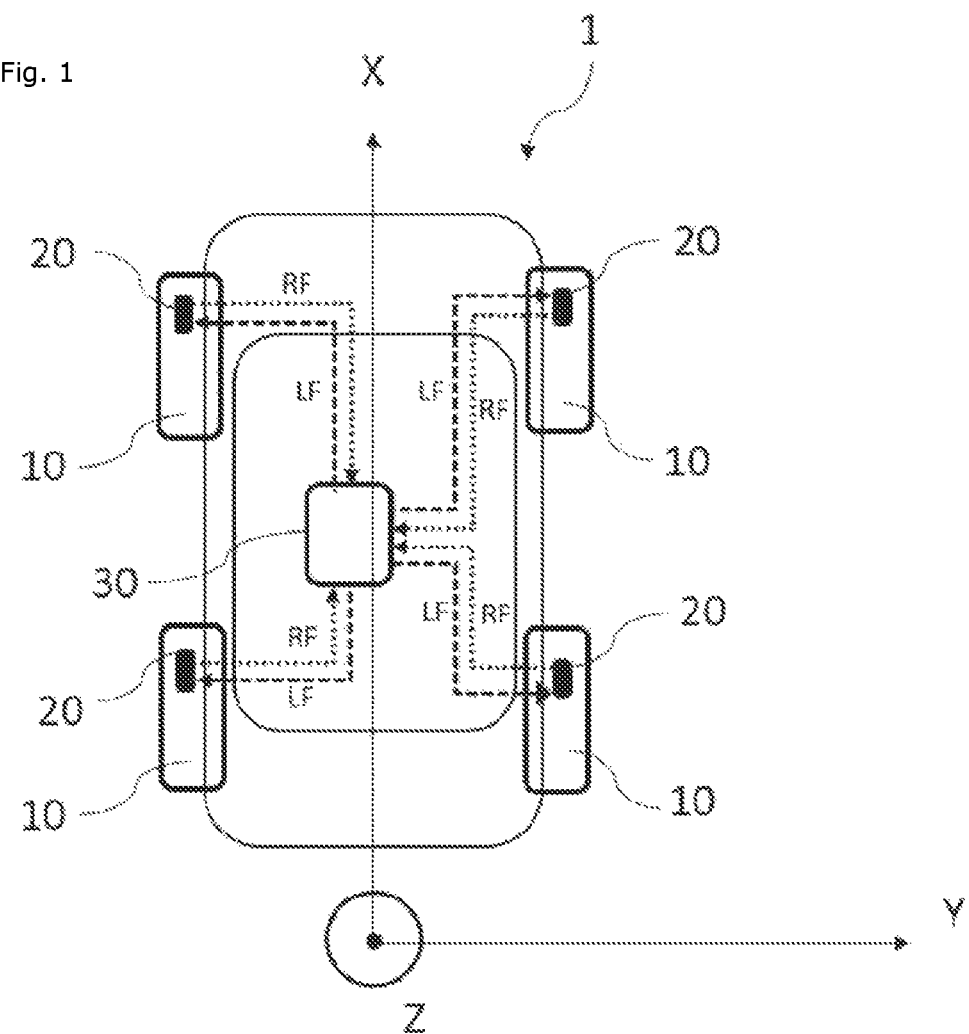
FIG. 1 schematically illustrates one embodiment of the vehicle according to the invention.

With reference to FIG. 1, an embodiment of the vehicle 1 according to the invention will be presented.

The vehicle 1 comprises a plurality of wheels 10 and at least one computer 30 comprising a reception module, and notably a radiofrequency reception module.

Each wheel 10 of the vehicle 1 comprises a tire.

At least one of the wheels 10 of the vehicle 1 comprises a sensor 20. Preferably, each wheel 10 of the vehicle 1 comprises a sensor 20.

The sensor 20 is notably mounted on the inflation valve of the tire of the wheel 10. For example, the sensor 20 is a temperature and pressure sensor commonly referred to as a "TPMS" (Tire Pressure Monitoring System), known to a person skilled in the art, and will not be described in further detail herein.

The sensor 20 is notably connected to the computer 30 via a wireless communication link. More specifically, a first wireless communication link, notably a radiofrequency (RF) communication link, allows the sensor 20 to send signals to the computer 30. Conversely, a second communication link, notably a low-frequency (LF) communication link, allows the computer 30 to send signals to the sensor 20.

The sensor 20 is notably configured to detect a stationary position of the vehicle. In other words, the sensor 20 detects that the vehicle 1 is indeed stationary, and that the vehicle has not simply stopped temporarily. To this end, the sensor 20 detects when the vehicle 1 stops, and then when the vehicle 1 has been stopped for a duration greater than a predefined transition duration $d_t$, for example, equal to 15 minutes.

In order to check that the vehicle 1 is in a stationary position, the sensor 20 also can be configured to measure the temperature in the tire, in other words the temperature of the gases occupying the internal volume of the wheel 10. If the value of the measured temperature is less than a predefined rest temperature, then the sensor 20 is configured to check that the vehicle 1 is in a stationary position.

The rest temperature defines the temperature reached by each tire when the vehicle 1 has been stopped for a duration greater than the predefined transition duration $d_t$, in other words when the vehicle 1 is in a stationary position. For example, the rest temperature is equal to 40° C.

The sensor 20 comprises a memory zone, in which the value of the rest temperature is recorded.

When the sensor 20 has detected that the vehicle 1 was in a stationary position, said sensor 20 is configured to measure the value of the initial reference internal pressure $P_{ref\_init}$ in the tire of the wheel 10.

Similarly, the sensor 20 is configured to measure the value of the initial reference temperature $T_{ref\_init}$ in the tire of the wheel 10.

The value of the measured initial reference internal pressure $P_{ref\_init}$ and the value of the measured initial reference temperature $T_{ref\_init}$ are also recorded in the memory zone of the sensor 20.

The sensor 20 is also configured to transmit a presence signal $s_p$ to the computer 30 via the first wireless communication link, notably when the sensor 20 has detected that the vehicle 1 was in a stationary position. The presence signal $s_p$ includes an identifier allowing the computer 30 to identify which sensor 20, and therefore which wheel 10, has transmitted the presence signal $s_p$. The presence signal $s_p$ also comprises the measured initial reference temperature $T_{ref\_init}$, the measured initial reference internal pressure $P_{ref\_init}$ and information notifying the computer 30 that the sensor 20 has detected that the vehicle 1 is in a stationary position.

In addition, the sensor 20 is configured to check that the tire of the wheel 10, to which the sensor 20 belongs, is sufficiently inflated. To this end, the sensor 20 is configured to measure the internal pressure $P_{10}$ of the tire of the wheel 10, i.e., the pressure of the gases occupying the internal volume of the wheel 10. Then, if the value of the measured internal pressure $P_{10}$ is greater than a predefined minimum inflation threshold, the tire is correctly inflated. The minimum inflation threshold is notably equal to 300 kPa. The value of the minimum inflation threshold is also recorded in the memory zone of the sensor 20.

In addition, the sensor 20 is also configured to check the stability of the temperature in the tire of the wheel 10, to which the sensor 20 belongs. To this end, the sensor 20 again measures the value of the temperature in the tire. The sensor 20 is configured to determine that the temperature is stable when the absolute value of the difference between the temperature measured in the tire and the initial reference temperature $T_{ref\_init}$ determined for said tire is less than a predefined temperature threshold. The temperature threshold is, for example, equal to 3° C. and the value of said temperature threshold is recorded in the memory zone of the sensor 20.

The sensor 20 also can be configured to determine a reference temperature value $T_{ref}$ by measuring the temperature in the tire, for example, every 30 or 60 seconds. The reference temperature $T_{ref}$ corresponds to an update of the value of the initial reference temperature $T_{ref\_init}$.

In addition, when a reference temperature value $T_{ref}$ has been measured, the sensor 20 is configured to re-check the stability of the temperature, by again measuring the value of the temperature in the tire. The sensor 20 is configured to determine that the temperature is stable when the absolute value of the difference between the temperature measured in the tire and the reference temperature $T_{ref}$ determined for said tire is less than the temperature threshold.

The sensor 20 is also configured to operate in a mode called "monitoring" mode for monitoring the tire of the wheel 10 to which the sensor 20 belongs. In the monitoring mode, the sensor 20 is configured to detect that the wheel 10, to which the sensor 20 belongs, has been raised relative to the ground. Therefore, 'raising' also designates the partial or complete raising of the vehicle 1 relative to the ground.

To this end, in the monitoring mode, the sensor 20 is configured to periodically measure, for example, every 4 seconds, the internal pressure $P_{10}$ of the tire of the wheel 10, in order to detect that the vehicle 1 has been raised. More specifically, the sensor 20 is configured to detect that the vehicle 1 has been raised if the absolute value of the difference between the measured internal pressure value $P_{10}$ and the value of the initial reference internal pressure $P_{ref\_init}$ is greater than a predetermined pressure difference threshold. The predetermined pressure difference threshold is notably equal to 1.5 kPa and its value is recorded in the memory zone of the sensor 20.

The sensor 20 is notably configured to periodically measure the reference internal pressure value $P_{ref}$, for example, by measuring the internal pressure of the tire every 30 seconds or every 60 seconds. The reference internal pressure value $P_{ref}$ notably corresponds to the update of the value of the initial reference internal pressure $P_{ref\_init}$.

Similarly, when the sensor 20 has measured a new value of the internal reference pressure $P_{ref}$, the sensor 20 is configured to detect that the vehicle 1 has been raised by again periodically measuring, notably every 4 seconds, the value of the internal pressure $P_{10}$ in the tire. Raising of the vehicle 1 is detected by the sensor 20 if the absolute value of the difference between the measured internal pressure value $P_{10}$ and the determined reference internal pressure value $P_{ref}$ is greater than the predetermined pressure difference threshold.

According to another example, the sensor 20 is configured to detect that the vehicle 1 has been raised if the measured internal pressure $P_{10}$ decreases, in other words, if the measured internal pressure variation $P_{10}$ is negative.

After having detected that the vehicle 1 has been raised, the sensor 20 is configured to operate in a mode called "raising" mode.

According to a first embodiment of the sensor 20, when the sensor 20 operates in the raising mode, the sensor 20 is configured to periodically transmit a raising detection signal to the computer 30 via the first communication link, as long as raising of the vehicle 1 is detected. For example, the sensor 20 transmits a raising detection signal every 4 seconds.

The raising detection signal notably comprises an identifier allowing the computer 30 to identify which sensor 20 sent the raising detection signal, raising information indicating that raising is detected and at least one wake-up stimulus, for ensuring that the reception module of the computer 30 is in the wake-up state for receiving the identifier and the raising information.

According to a second embodiment of the sensor 20, the sensor 20, operating in raising mode, is configured to transmit a raising detection signal, as described in the first embodiment, to the computer 30 via the first communication link. The sensor 20 is then configured to periodically receive a response signal from the computer 30 via the second communication link. The sensor 20 is then configured to measure the strength of each received response signal. Notably, the strength corresponds to the RSSI (Received Signal Strength Indicator).

Finally, the sensor 20 is configured to detect the detachment of the wheel 10 comprising the sensor 20 from the vehicle 1, if the absolute value of the difference between at least one measured strength value and a second predetermined reference strength value $P_{RSSI\_ref2}$ is greater than a second predetermined strength variation threshold.

Detachment of the wheel 10 from the vehicle 1 notably means the removal of the wheel 10 from the vehicle 1 and a movement of said wheel 10 from the vehicle 1.

The second reference strength value $P_{RSSI\_ref2}$ can be predetermined by the manufacturer. In another embodiment, the sensor 20 is configured to determine the second reference strength value $P_{RSSI\_ref2}$, notably by measuring the strength of the first response signal received by the sensor 20. In both cases described above, the reference strength value $P_{RSSI\_ref2}$ is notably recorded in the memory zone of the sensor 20.

The second predetermined strength variation threshold is equal to 5 dBm, for example. The value of the second strength variation threshold is notably recorded in the memory zone of the sensor 20.

According to another example, the sensor 20 is configured to detect the detachment of the wheel 10 if the value of the measured strength is less than a second predetermined strength threshold. In the present case, the second predetermined strength threshold is notably equal to −34 dBm. The value of the second strength threshold is notably recorded in the memory zone of the sensor 20.

If detachment of the wheel 10 is detected, the sensor 20 is configured to send at least one detachment detection signal to the computer 30 via the first communication link, indicating that a wheel 10 has been detached from the vehicle, and therefore that said wheel has been stolen.

According to another example, if detachment of the wheel 10 is detected, the sensor is configured to send a notification of the theft of the wheel 10 to the driver or to the user of the vehicle 1 whose wheel 10 has been stolen.

According to a third embodiment of the sensor 20, the sensor 20, operating in the raising mode, sends a raising detection signal, as described above in the first embodiment of the sensor 20, to the computer 30 via the first communication link, to notify the computer 30 that raising is detected.

In addition, the sensor 20 is configured to periodically measure the acceleration of the wheel 10, to which the sensor 20 belongs, along the axis of rotation of the wheel 10.

In addition, the sensor 20 is configured to send each measured acceleration value to the computer 30 via the first communication link.

In addition, the sensor 20 is configured to determine the reference acceleration value and to send the determined reference acceleration value to the computer 30, for example, by integrating the reference acceleration value with the presence signal $s_p$.

According to a fourth embodiment of the sensor 20, the sensor 20, operating in the raising mode, sends a raising detection signal, as described above in the first embodiment of the sensor 20, to the computer 30 via the first communication link, to notify the computer 30 that raising is detected.

In addition, the sensor 20 is configured to periodically measure the acceleration of the wheel 10, to which the sensor 20 belongs, along the axis of rotation of the wheel 10.

The sensor 20 is also configured to detect the detachment of the wheel 10 from the vehicle 1, if the absolute value of the variation of the measured acceleration is greater than a predetermined acceleration variation threshold. In the present case, the acceleration variation threshold is equal to 0.4 g, for example, and its value is recorded in the memory zone of the sensor 20.

According to another example, the sensor 20 is configured to detect the detachment of the wheel 10 if the absolute value of the difference between at least one measured acceleration value and a predetermined reference acceleration value is greater than the predetermined acceleration variation threshold.

The reference acceleration value is notably determined by the sensor 20.

According to yet another example, the sensor 20 is configured to detect the detachment of the wheel 10 if the absolute value of the measured acceleration is greater than a predetermined acceleration threshold. In the present case, the predetermined acceleration threshold is notably equal to 1.5 g and its value is recorded in the memory zone of the sensor 20.

If detachment of the wheel 10 is detected, the sensor 20 is configured to send at least one detachment detection signal to the computer 30 via the first communication link.

According to another example, if detachment of the wheel 10 is detected, the sensor 20 is configured to send a notification of the theft of the wheel 10 to the driver or to the user of the vehicle 1 whose wheel 10 has been stolen. For example, the sensor 20 is connected to the phone of the driver or of the user of the vehicle 1 via a Bluetooth® communication link, and transmits a message via said Bluetooth® communication link.

The sensor 20 is configured to operate in the raising mode as long as raising is detected, or over a predetermined duration, ranging between 3 and 30 minutes, preferably between 4 and 5 minutes.

The computer 30 is notably mounted in the vehicle 1, for example, in the dashboard, or in a central armrest, or even in the ceiling of the vehicle 1.

As described above, the computer 30 comprises a reception module capable of receiving signals sent by the sensor 20 via the first communication link, and a memory zone.

In addition, the computer 30 is connected to at least one signaling device such as the horn, the position, dipped beam lights, the main beam lights, etc.

The computer 30 is configured to detect a stationary position of the vehicle. In other words, the computer 30 detects that the vehicle 1 is parked and that the vehicle 1 has not simply stopped temporarily. To this end, the computer 30 detects when the vehicle 1 is stopped and/or when the doors of the vehicle 1 are locked by the driver, then the computer detects when the vehicle 1 is stopped, and therefore immobile, for a duration greater than the transition duration $d_t$.

In another embodiment, the computer 30 is configured to check that the vehicle 1 is in a stationary position on the basis of the temperature outside the vehicle 1. To this end, the computer 30 is connected to an outside temperature sensor, previously mounted in the vehicle 1. The outside temperature sensor is configured to measure the temperature outside the vehicle 1 and to send the at least one measured outside temperature value to the computer 30.

On the basis of said received outside temperature value, the computer 30 is configured to determine the temperature in the tire, since the temperature in the tire is equal to the outside temperature, to which a positive or negative compensation value is added that is predefined and known by the computer 30. If the value of the temperature in the tire is less than the predefined rest temperature, then the computer 30 is configured to confirm that the vehicle 1 is in a stationary position.

In addition, the computer 30 is configured to receive a presence signal $s_p$ sent by at least one sensor 20 via their respective first wireless communication link. For each received presence signal $s_p$, the computer 30 is configured to identify which sensor 20 has sent the presence signal $s_p$ on the basis of the identifier included in the presence signal.

For each received presence signal $s_p$, the computer 30 is also configured to measure the value of the reference strength $P_{RSSI\_ref}$, notably by measuring the strength, and notably the RSSI strength, of the received presence signal $s_p$. In addition, the computer 30 is configured to record, in its memory zone, the value of the measured reference strength $P_{RSSI\_ref}$. Thus, for each wheel 10 whose sensor 20 has sent a presence signal $s_p$, the computer knows the value of the reference strength $P_{RSSI\_ref}$.

Furthermore, for each received presence signal $s_p$, the computer 30 is also configured to record, in its memory zone, the value of the initial reference internal pressure $P_{ref\_init}$ and the value of the initial reference temperature $T_{ref\_init}$ included in the received presence signal $s_p$.

Thus, the computer 30 knows, for each wheel 10 whose sensor 20 has sent a presence signal $s_p$, the value of the initial reference internal pressure $P_{ref\_init}$, the value of the initial reference temperature $T_{ref\_init}$ and the value of the reference strength $P_{RSSI\_ref}$.

The computer 30 is also configured to check the coherence of the value of the initial reference internal pressure $P_{ref\_init}$, of the value of the initial reference temperature $T_{ref\_init}$ and of the value of the reference strength $P_{RSSI\_ref}$ recorded for each sensor 20.

The value of the initial reference internal pressure $P_{ref\_init}$ is coherent if it is greater than the predefined minimum inflation threshold. This means that the tire is sufficiently inflated. The predefined minimum inflation threshold is recorded in the memory zone of the computer 30.

The value of the initial reference temperature $T_{ref\_init}$ is coherent if it is less than the predefined rest temperature, for example, equal to 40° C., with said value of the rest temperature notably being recorded in the memory zone of the computer 30.

Thus, the computer 30 in this case checks that the pressure of the tire is not influenced by a high temperature.

The value of the reference strength $P_{RSSI\_ref}$ is coherent if it is greater than the predefined reference strength threshold. The reference strength threshold is, for example, predefined at −85 dBm and its value is recorded in the memory zone of the computer 30.

Various embodiments will now be described of the computer 30 configured to detect that the vehicle 1 has been raised and/or that a wheel 10 has been detached from the vehicle 1.

According to the first embodiment of the computer 30, the reception module of the computer 30 is also configured to periodically receive a raising detection signal sent by at least one sensor 20 via the first communication link. In addition, for each received raising detection signal, the computer 30 is configured to identify to which wheel 10 the sensor 20 belongs that sent the raising detection signal on the basis of the identifier of the received raising detection signal.

Furthermore, the computer 30 understands that raising of the vehicle 1 is detected, on the basis of the raising information included in the at least one received raising detection signal.

The computer 30 is also configured to measure the strength of each received raising detection signal.

The computer 30 is configured to detect the detachment from the vehicle 1 of the wheel 10 whose sensor 20 sent a raising detection signal, if the absolute value of the difference between the measured strength value, of said raising detection signal, and the predetermined reference strength value $P_{RSSI\_ref}$, corresponding to said wheel 10, is greater than a predetermined strength variation threshold.

The predetermined strength variation threshold is notably equal to 30 dBm. The value of the strength variation threshold is notably recorded in the memory zone of the computer 30.

According to another example, the computer 30 is configured to detect the detachment of the wheel 10 if the value of the measured strength is less than a predetermined strength threshold. In other words, the computer 30 detects the detachment of the wheel 10, when it detects a reduction in the strength of the raising detection signals sent by the sensor included in said wheel 10. In this case, the predetermined strength threshold is notably equal to −95 dBm. The value of the strength threshold is notably recorded in the memory zone of the computer 30.

According to the second embodiment of the computer 30, the computer 30 is configured to receive a raising detection signal sent by at least one sensor 20. The computer is then configured to periodically transmit, for example, every 4 seconds, a response signal, via the second communication link, to each sensor 20 that sent a raising detection signal. The computer 30 is then configured to receive a detachment detection signal sent by at least one sensor 20, indicating that the wheel 10 comprising said sensor 20 has been detached from the vehicle 1, in other words, that the wheel 10 has been stolen.

According to the third embodiment of the computer 30, the computer 30 is configured to receive a raising detection signal sent by at least one sensor 20.

The computer 30 is configured to periodically receive an acceleration value measured and sent by each sensor 20 that has notably previously sent a raising detection signal.

The computer 30 is also configured to detect the detachment of a wheel 10 on the basis of the at least one measured acceleration value sent by the sensor 20 mounted in said wheel 10. More specifically, the computer 30 detects the detachment of the wheel 10 if the absolute value of the variation of the measured acceleration, in other words, the absolute value of the difference between two measured acceleration values successively received by the computer 30, is greater than a predetermined acceleration variation threshold, for example, equal to 0.4 g. The value of the acceleration variation threshold is notably recorded in the memory zone of the computer 30.

According to another example, the computer 30 detects the detachment of the wheel 10 if the absolute value of the difference between at least one received measured acceleration value and a predetermined reference acceleration value is greater than a predetermined acceleration variation threshold.

The reference acceleration value is notably determined by the sensor 20 and sent by the sensor 20 to the computer 30.

The predetermined acceleration variation threshold is, for example, equal to 0.4 g and its value is notably recorded in the memory zone of the computer 30.

According to yet another example, the computer 30 is configured to detect the detachment of the wheel 10 if the absolute value of at least one measured acceleration value is greater than a predetermined acceleration threshold. In the present case, the predetermined acceleration threshold is equal to 1.5 g.

According to the fourth embodiment of the computer 30, the computer 30 is configured to receive at least one detachment detection signal sent by at least one sensor 20 indicating that the wheel 10, to which the sensor 20 belongs, has been detached from the vehicle 1, in other words, that the wheel 10 has been stolen.

If the computer 30 receives a detachment detection signal for at least one wheel 10 or if the computer 30 itself detects the detachment of at least one wheel 10, then the computer 30 is configured to indicate the theft of said wheel 10.

Notably, the computer 30 is configured to signal in the vicinity of the vehicle 1, notably by sending a signal for activating the lights of the vehicle and/or the horn in order to activate the lights of the vehicle 1 and/or the horn and to scare away the thief in action.

In addition, the computer 30 is also configured to remotely notify the owner and/or the user of the vehicle 1 of the theft of a wheel 10, notably by sending a notification signal. For example, the notification signal can be a message sent to the phone of the owner and/or of the user of the vehicle 1, or even a voice message left on the answer phone of the phone of the owner and/or of the user of the vehicle 1.

A notification signal also can be sent to a remote third party, for example, an insurance company or the police.

Figure 2:
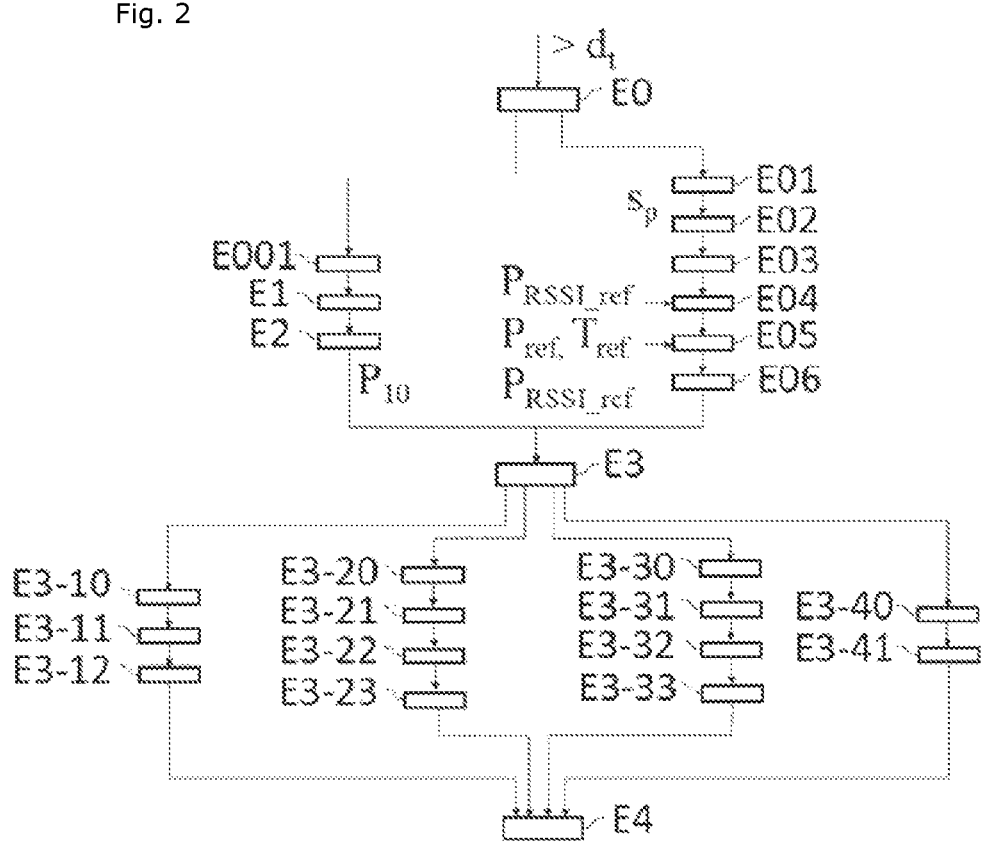
FIG. 2 schematically illustrates one embodiment of the method according to the invention.

With reference to FIG. 2, an embodiment of the method according to the invention will now be described that is implemented by the vehicle 1 as described above.

In order to simplify the description, the method will be described for a vehicle 1 for which a single wheel 10 comprises a sensor 20.

In the case where each wheel 10 comprises a sensor 20, the method is repeated for each sensor 20.

The method firstly comprises a step E0 of detecting the stationary position of the vehicle 1. The stationary position of the vehicle 1 corresponds to the fact that the vehicle 1 is actually parked, and that the stop is not a temporary stop of the vehicle 1.

To this end, during this step, the computer 30 and the sensor 20 check that the stop time of the vehicle 1 is greater than the predefined transition duration $d_t$.

Furthermore, when the vehicle 1 is moving, the temperature of each tire increases significantly. Thus, in order to check that the vehicle 1 is in a stationary position, the sensor 20 and/or the computer 30 check that the temperature of the tire is less than the predefined rest temperature.

When the sensor 20 has detected that the vehicle 1 was in a stationary position, said sensor 20 measures the value of the initial reference internal pressure $P_{ref\_init}$ in the tire of the wheel 10.

Similarly, the sensor 20 measures the value of the initial reference temperature $T_{ref\_init}$ in the tire of the wheel 10.

The method also comprises a step E01 of the sensor 20 transmitting a presence signal $s_p$ to the computer 30 over the first communication link. The presence signal $s_p$ is notably a radiofrequency signal and notably comprises an identifier, the value of the determined initial reference internal pressure $P_{ref\_init}$, the value of the initial reference temperature $T_{ref\_init}$, and information notifying the computer 30 that the sensor 20 has detected that the vehicle 1 is in a stationary position.

The method then comprises a step E02 of the computer 30 receiving the presence signal $s_p$.

The method then comprises a step E03 of the computer 30 checking the identifier of the received presence signal $s_p$. The checking step E03 allows the computer 30 to determine which sensor 20, and therefore from which wheel 10, transmitted the presence signal $s_p$, notably when a plurality of wheels 10 of the vehicle 1 comprises a sensor 20.

Thus, the following steps of the method relate to said sensor 20 that sent the presence signal $s_p$, and therefore relate to the wheel 10 comprising said sensor 20.

In addition, the method comprises a step E04 of the computer 30 measuring the reference strength $P_{RSSI\_ref}$ by measuring the strength, and notably the RSSI strength, of the received presence signal $s_p$.

In addition, the method comprises a step E05 of recording the value of the initial reference internal pressure $P_{ref\_init}$ and the initial reference temperature value $T_{ref\_init}$ included in the presence signal $s_p$, in the memory zone of the computer 30. The value of the initial reference internal pressure $P_{ref\_init}$ and the value of the initial reference temperature $T_{ref\_init}$ relate to the tire of the wheel 10 comprising the sensor 20 that sent said presence signal $s_p$.

Furthermore, the recording step E05 also comprises recording the reference strength $P_{RSSI\_ref}$ relating to said presence signal $s_p$ and therefore to the wheel 10 comprising the sensor 20, measured by the computer 30, in the memory zone of the computer 30.

The method then comprises a step E06 of checking the coherence of the value of the initial reference internal pressure $P_{ref\_init}$, of the initial reference temperature $T_{ref\_init}$ and of the reference strength $P_{RSSI\_ref}$.

The value of the initial reference internal pressure $P_{ref\_init}$ is coherent if it is greater than the predefined minimum inflation threshold. The value of the initial reference temperature $T_{ref\_init}$ is coherent if it is less than the predefined rest temperature, for example, equal to 40° C. The value of the reference strength $P_{RSSI\_ref}$ is coherent if it is greater than the predefined reference strength threshold, for example, equal to −85 dBm.

The method also comprises a step E001 of the sensor 20 checking the inflation of the tire of the wheel 10. To this end, the sensor 20 measures the internal pressure $P_{10}$ in the tire and checks that the value of the measured internal pressure $P_{10}$ is greater than the minimum inflation threshold.

The method then comprises a step E1 of checking the stability of the temperature in the tire of the wheel 10 to which the sensor 20 belongs.

During this step, the sensor 20 checks the stability of the temperature in the tire. To this end, the sensor 20 measures the value of the temperature in the tire. The sensor 20 determines that the temperature is stable when the absolute value of the difference between the temperature measured in the tire and the initial reference temperature $T_{ref\_init}$ determined for said tire is less than the predefined temperature threshold, for example, equal to 3° C.

The sensor 20 can also determine the reference temperature value $T_{ref}$ by measuring the temperature in the tire, for example, every 30 or 60 seconds. The reference temperature $T_{ref}$ corresponds to an update of the value of the initial reference temperature $T_{ref\_init}$.

Similarly, when a reference temperature value $T_{ref}$ has been measured, the sensor 20 is configured to re-check the stability of the temperature, by again measuring the value of the temperature in the tire. The sensor 20 then determines that the temperature is stable when the absolute value of the difference between the temperature measured in the tire and the reference temperature $T_{ref}$ determined for said tire is less than the predefined temperature threshold.

During the raising detection step E2, the sensor 20 operates in the monitoring mode, and periodically measures, for example, every 4 seconds, the internal pressure $P_{10}$ of the tire of the wheel 10. If the absolute value of the difference between the measured internal pressure value $P_{10}$ and the predetermined initial reference internal pressure value $P_{ref\_init}$ is greater than the predetermined pressure difference threshold, then the sensor 20 detects that the vehicle 1 has been raised.

In this way, the sensor 20 detects a reduction in the internal pressure $P_{10}$ in the tire.

The sensor 20 also periodically measures the reference internal pressure value $P_{ref}$, for example, by measuring the internal pressure of the tire every 30 seconds or every 60 seconds. The reference internal pressure value $P_{ref}$ notably corresponds to the update of the value of the initial reference internal pressure $P_{ref\_init}$.

Similarly, when the sensor 20 has measured a new value of the internal reference pressure $P_{ref}$, the sensor 20 again measures the internal pressure $P_{10}$ and detects that the vehicle 1 has been raised if the absolute value of the difference between the measured internal pressure value $P_{10}$ and the predetermined reference internal pressure value $P_{ref}$ is greater than the predetermined pressure difference threshold.

After raising of the vehicle 1 has been detected, the method comprises a step E3 of activating the raising mode of the sensor 20, with said activation step being defined over the predetermined duration or as long as raising of the vehicle 1 is detected.

According to a first embodiment of the method, the method is implemented by the first embodiment of the sensor 20 and the first embodiment of the computer 30. The first embodiment of the method comprises a step E3-10 of the sensor 20 periodically transmitting a raising detection signal to the computer 30 via the first communication link.

The method then comprises a step of the computer 30 periodically receiving raising detection signals sent by the sensor 20.

For each raising detection signal received by the computer 30, the method then comprises a step E3-11 of the computer 30 measuring the strength of the raising detection signal.

After the measurement step E3-11, the method can comprise a step E3-12 of the computer 30 detecting the detachment of the wheel 10 from the vehicle 1. For example, the computer 30 detects the detachment of the wheel 10 when the absolute value of the difference between the measured strength value and the value of the predetermined reference strength $P_{RSSI\_ref}$ is greater than the predetermined strength variation threshold.

According to another example, the computer 30 detects the detachment of the wheel 10 if the value of the measured strength is less than the predetermined strength threshold.

According to a second embodiment of the method, the method is implemented by the second embodiment of the sensor 20 and the second embodiment of the computer 30. The second embodiment of the method comprises a step E3-20 of the sensor 20 transmitting at least one raising detection signal to the computer 30 via the first communication link.

The method then comprises a step of the computer 30 receiving the raising detection signal.

After receiving the raising detection signal, the method comprises a step E3-21 of the computer 30 periodically transmitting a response signal to the sensor 20 via the second communication link.

The method then comprises a step of the sensor 20 receiving each response signal. For each response signal received by the sensor 20, the method comprises a step E3-22 of the sensor 20 measuring the strength of the response signal.

The method comprises a step E3-23 of the sensor 20 detecting the detachment of the wheel 10 from the vehicle 1. For example, the sensor 20 detects the detachment of the wheel 10 when the absolute value of the difference between at least one measured strength value and the second predetermined reference strength value $P_{RSSI\_ref2}$ is greater than the second predetermined strength variation threshold.

According to another example, the sensor 20 detects the detachment of the wheel 10 if the value of the measured strength is less than the second predetermined strength threshold.

After detecting the detachment of the wheel 10, the method comprises a step of the sensor 20 sending a detachment detection signal to the computer 30. The computer 30 then receives the detachment detection signal sent by the sensor 20.

According to a third embodiment of the method, the method is implemented by the third embodiment of the sensor 20 and the third embodiment of the computer 30. The third embodiment of the method comprises a step of the sensor 20 sending the computer 30 a raising detection signal, notifying the computer 30 that raising of the vehicle 1 has been detected.

The method then comprises a step E3-30 of the sensor 20 periodically measuring acceleration.

The method then comprises a step E3-31 of the sensor 20 sending each measured acceleration value to the computer 30. The method therefore also comprises a step E3-32 of the computer 30 receiving each measured acceleration value.

The method then comprises a step E3-33 of the computer 30 detecting the detachment of the wheel 10 on the basis of at least one received measured acceleration value.

To this end, the computer 30 detects the detachment of the wheel 10 if the absolute value of the variation of the measured acceleration is greater than a predetermined acceleration variation threshold.

In another embodiment, the computer 30 detects the detachment of the wheel 10 if the absolute value of the difference between a received measured acceleration value and the predetermined reference acceleration value is greater than a predetermined acceleration variation threshold.

According to yet another example, the computer 30 detects the detachment of the wheel 10 if the absolute value of at least one measured acceleration value is greater than the predetermined acceleration threshold.

Furthermore, the reference acceleration value is notably determined by the sensor The sensor 20 then sends the computer 30 the determined reference acceleration value.

According to a fourth embodiment of the method, the method is implemented by the fourth embodiment of the sensor 20 and the fourth embodiment of the computer 30. The fourth embodiment of the method can comprise a step of the sensor 20 sending the computer 30 a raising detection signal, notifying the computer 30 that raising of the vehicle 1 has been detected.

The method then comprises a step E3-40 of the sensor 20 periodically measuring acceleration.

The method then comprises a step E3-41 of the sensor 20 detecting the detachment of the wheel 10, on the basis of at least one measured acceleration value. To this end, the sensor 20 detects the detachment of the wheel 10 if the absolute value of the variation of the measured acceleration is greater than the predetermined acceleration variation threshold.

According to another example, the sensor 20 detects the detachment of the wheel 10 if the absolute value of the difference between a measured acceleration value and a predetermined reference acceleration value is greater than the predetermined acceleration variation threshold.

Furthermore, before the step E3-41 of detecting the detachment of the wheel 10, the sensor 20 determines the reference acceleration value.

According to yet another example, the sensor 20 detects the detachment of the wheel 10 if the absolute value of at least one measured acceleration value is greater than the predetermined acceleration threshold.

After detecting the detachment of the wheel 10, the method comprises a step of the sensor 20 sending the computer 30 a detachment detection signal. The computer 30 therefore receives the detachment detection signal sent by the sensor 20.

After detecting the detachment of the wheel 10, the method comprises a step E4 of signaling a theft of the wheel 10 that comprises said sensor 20.

According to the first embodiment and the third embodiment of the method, during the step E4 of signaling a theft, the computer 30 issues a notification as such in the vicinity of the vehicle 1 and remotely.

More specifically, in the vicinity of the vehicle 1, the computer 30 sends a signal for activating the lights of the vehicle and/or the horn in order to activate the lights of the vehicle 1 and/or the horn and to scare away the thief of the wheel 10.

Remotely, the computer 30 notably notifies the owner or the driver of the vehicle 1, notably via an SMS sent to the mobile phone of the owner or of the driver, or via a voice message left on the answer phone of said phone. Furthermore, the computer 30 can also notify the insurance company insuring the vehicle 1 or law enforcement agencies.

According to the second embodiment and the fourth embodiment of the method, after the computer 30 receives the detachment detection signal, the computer 30 issues a notification as such in the vicinity of the vehicle 1 and remotely, as described above.

Thus, advantageously, the method as described, implemented by a computer 30 and at least one sensor 20 as described above, allows the theft of a wheel 10 of a vehicle 1 to be detected and the owner or the driver of said vehicle 1 to be notified, where applicable.

The invention claimed is:

1. A method for signaling the theft of a wheel of a motor vehicle, said vehicle comprising a plurality of wheels and a computer, with at least one of the wheels comprising a sensor, said method comprising, for the at least one wheel:

measuring at least one value of an internal pressure of the tire of the wheel;

detecting that the vehicle has been raised when an absolute value of a difference between the at least one measured internal pressure value and a predetermined reference internal pressure value is greater than a predetermined pressure difference threshold;

when raising of the vehicle is detected, detecting a detachment of the wheel;

when the detachment of the wheel is detected, signaling the theft of the wheel;

wherein the detecting the detachment of the wheel comprises:

in a mode called "raising" mode, the sensor periodically transmitting a raising detection signal to the computer as long as the raising of the vehicle is detected;

the computer receiving said transmitted raising detection signal;

measuring a strength of the received raising detection signal; and the computer detecting the detachment of the wheel if at least one measured strength value is less than a predetermined strength threshold.

2. The method as claimed in claim 1, wherein the at least one transmitted raising detection signal is a radio frequency type signal.

3. The method as claimed in claim 1, wherein the computer is configured to send a notification signal to the user of the vehicle in the event of theft of the wheel.

4. A computer program product, comprising a set of program code instructions, which, when they are executed by one or more processors, configure the one or more processors to implement a method as claimed in claim 1.

5. A motor vehicle, said vehicle comprising a plurality of wheels and a computer, with at least one of the wheels comprising a sensor, the computer and the at least one sensor being configured to implement the method as claimed in claim 1.

6. A sensor for a motor vehicle, said vehicle comprising a plurality of wheels and a computer, said sensor being intended to be mounted in a wheel of said vehicle, said sensor being configured for:

measuring at least one value of an internal pressure of the tire of the wheel;

detecting that the vehicle has been raised if an absolute value of the difference between the at least one measured internal pressure value and a predetermined reference internal pressure value is greater than a predetermined pressure difference threshold;

transmitting a raising detection signal to the computer;

in a raising mode, periodically measuring an acceleration along the axis of rotation of the wheel; and detecting a detachment of the wheel if the absolute value of the variation of the measured acceleration is greater than a predetermined acceleration variation threshold.

7. A sensor as claimed in claim 6, configured to send a notification signal to the user of the vehicle in the event of the theft of the wheel.

* * * * *